(12) United States Patent
Darmann

(10) Patent No.: US 7,551,410 B2
(45) Date of Patent: Jun. 23, 2009

(54) SUPERCONDUCTOR CURRENT LIMITING SYSTEM AND METHOD

(75) Inventor: Francis Anthony Darmann, New South Wales (AU)

(73) Assignee: S C Power Systems, Inc., San Mateo, CA (US)

( * ) Notice: Subject to any disclaimer, the term of this patent is extended or adjusted under 35 U.S.C. 154(b) by 318 days.

(21) Appl. No.: 10/562,171

(22) PCT Filed: Jul. 6, 2004

(86) PCT No.: PCT/AU2004/000906

§ 371 (c)(1),
(2), (4) Date: Dec. 21, 2005

(87) PCT Pub. No.: WO2005/004299

PCT Pub. Date: Jan. 13, 2005

(65) Prior Publication Data

US 2007/0115598 A1    May 24, 2007

(30) Foreign Application Priority Data

Jul. 7, 2003   (AU) .................... 2003903489

(51) Int. Cl.
*H02H 7/00*    (2006.01)
(52) U.S. Cl. .................... 361/19; 323/360; 505/850
(58) Field of Classification Search ............ 361/19; 323/360, 362; 505/850; 565/850
See application file for complete search history.

(56) References Cited

U.S. PATENT DOCUMENTS

| 4,045,823 | A | * | 8/1977 | Parton ................... 361/58 |
| 4,700,257 | A | * | 10/1987 | Bekhaled ................ 361/19 |
| 5,930,095 | A | * | 7/1999 | Joo et al. ............... 361/58 |
| 6,049,036 | A | * | 4/2000 | Metra ................... 174/15.5 |
| 7,193,825 | B2 | * | 3/2007 | Darmann et al. ......... 361/19 |

FOREIGN PATENT DOCUMENTS

FR    2621749 A    *    4/1989

OTHER PUBLICATIONS

P.D. Van, et al. Fault Current Limiter For A Three-phase line, pp. 1-11. FR (2,621, 749). Apr. 14, 1989.*

* cited by examiner

*Primary Examiner*—Stephen W Jackson
*Assistant Examiner*—Terrence R Willoughby
(74) *Attorney, Agent, or Firm*—Fay Kaplun & Marcin, LLP

(57) ABSTRACT

A fault current limiter for limiting current faults in an electrical network comprising: a series of phase coils located adjacent a superconductive coil for fault current limiting phase faults within the network; a series of neutral coils located adjacent the superconductive coil for fault current limiting neutral earthing faults in the electrical network.

6 Claims, 11 Drawing Sheets

| | Neutral earthing coils, for limiting earth fault currents by a greater than three phase symmetrical fault currents. |
|---|---|
| —— | Three sets of AC coils for limiting symmetrical three phase faults - ident |
| ~~~ | Cryostat |
| ≈≈≈ | HTS coil and support |
| —— | Footprint |
| ● | Iron core leg, diameter: d, window: w x h |

Phase 'a' fault current in each of the three transformer line and neutrals for a phase 'a' to ground fault on the 11 kV bus without NER installed. The phase current amplitude is 9.19 kA (6.50 kA rms). And is equivalent to the neutral current amplitude.

Fault current at the 11 kV bus for a single line to ground fault on the 11 kV bus in the three transformer case without an NER. Steady state peak amplitude = 27.72 kA (19.6 kA rms)

Line to ground fault current on the 11 kV bus in the three transformer case with a 3.9 Ω NER installed. Steady state amplitude = 2.36 kA (1.67 kA rms). Refer Figure 16.

Phase 'a' fault current in each of the three transformers for a phase 'a' to ground fault on the 11 kV bus with a 3.9 Ω NER installed. The steady state phase current and neutral current amplitude is 0.79 kA (0.56 kA rms).
Note. All three individual current waveforms in the faulted phase from the three transformers overlap in this diagram.

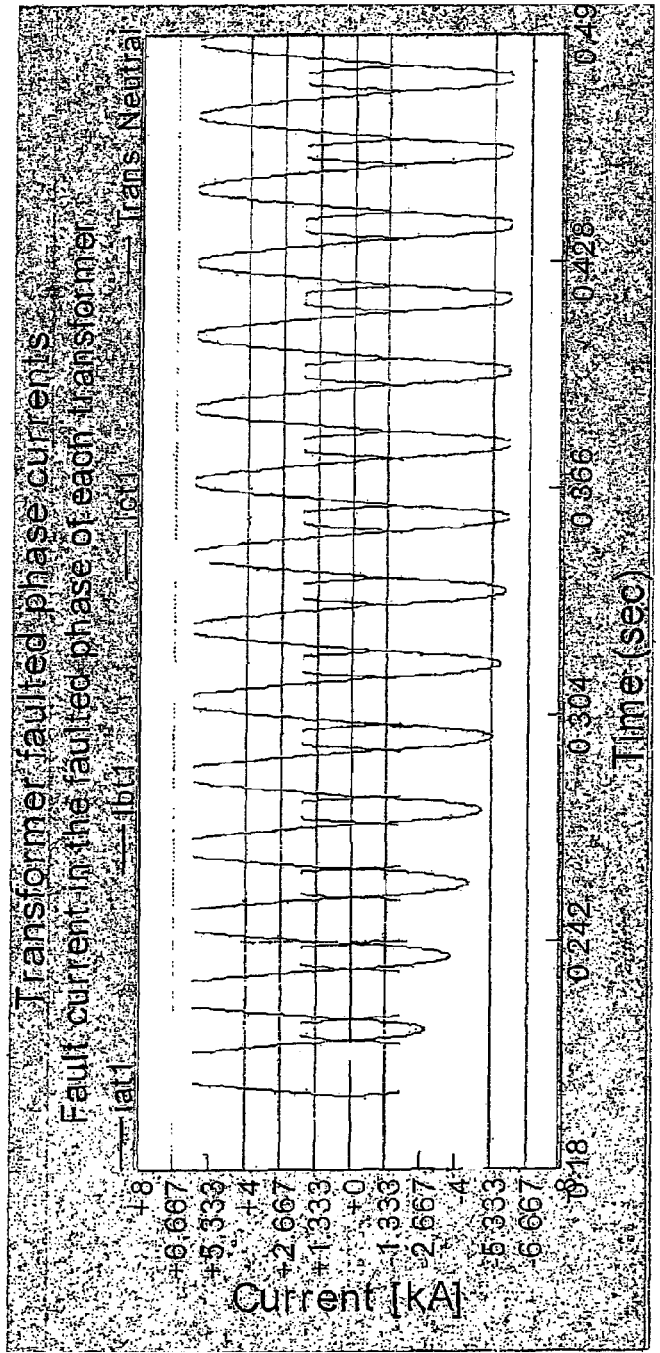

Effect of an 8 terminal SC-FCL on the earth fault current and the line fault current. The earth fault current is limited by a much greater amount compared to the phase currents as required by utilities. This design therefore allows the three phase line current to be limited by an amount which will meet the fault level requirements of the site, and the earth current to be limited by other criteria: The blue line shows how the line current is limited by the FCL and the black line shows how the earth current is limited by the FCL by a mush greater amount. Note, because this is a line to ground fault, the other 2 phase currents are not effected and are small and do not show up on this graph. The fault current is limited to 1.4 kA peak or 1 kA RMS per transformer (i.e 3 kA for the whole substation), as required.

Fig. 11

SUPERCONDUCTOR CURRENT LIMITING SYSTEM AND METHOD

PRIORITY CLAIM

This application claims the benefit of PCT Application Serial No. PCT/AU04/00906, filed on Dec. 21, 2005, which claims the benefit of Australian Patent Application No. 2003903489, filed on Jul. 7, 2003, the specifications of which are expressly incorporated herein, in their entirety, by reference.

FIELD OF THE INVENTION

The present invention relates to the field of superconductor fault current limiters and, in particular, discloses a high temperature superconductor (HTS) fault current Limiter (FCL) having a design utilising either split and solid limb cores or a combination of both in addition to providing for neutral earthing coils for limiting earth fault currents.

BACKGROUND OF THE INVENTION

The discovery of high temperature superconductors has lead to the development of a number of applications for their use. Superconductors are known to have the property that they have zero direct current (DC) resistance below a critical temperature $T_c$. They also have zero DC resistance below a critical current $I_c$ and a critical magnetic field $B_c$.

One potential use of HTS is in FCLs. HTS can be used in FCLs in a number of ways, and the use of HTS to limit fault currents is an elegant solution to the ever-present short circuit threat in power networks.

Traditionally, electrical systems have been developed around three separate phases and a neutral path. Further, authorities often mandate that faults in the system should be dealt with in a controlled manner. In particular, there is a concern to limit the effects of fault currents within the electrical distribution system. The HTS FCL designs are ideal for limiting fault currents.

There are a number of different classes of faults which can occur on a three phase transmission system. These include:

1. Three Phase Faults

In this case, a short circuit is formed between all three phases of the three phase line. A typical example of this occurs when a tree branch falls directly across the three phases of an overhead line. In addition, this fault may occur between all three lines and the neutral conductor, such as when a cable, with a neutral connected as an earthed shield, is severed by excavation equipment. Both types of faults are also known in the industry as symmetrical faults, because the fault current in each of the three phases will be of the same steady state RMS magnitude. Under three phase short circuit conditions, and in a balanced three phase system, operating at a constant frequency (eg. 50 Hz) and sinusoidal currents and voltages, the neutral/earth fault current will be negligible in the steady state because all three fault currents will remain at a 120 degree phasor displacement, thus cancelling vectorially and leaving a null neutral/earth current. Hence, no devices are normally required in the earth/neutral circuit to protect against this type of fault.

2. Double Phase to Ground Faults.

In this example, a short circuit is formed between two phases of the network and ground. The resulting steady state fault current therefore does not cancel (in the steady state mode) as in (1), but adds vectorially to form an earth/neutral fault current.

3. Single Line to Ground Faults.

For single line to ground faults, a single line forms a short circuit directly to ground. The resulting fault current therefore flows through the ground back to the source neutral. An example of this occurs when an underground 3 phase cable is pieced by excavation equipment, or, when a single bare overhead line falls and touches the ground.

It would be desirable to reduce the deleterious earth fault currents for double phase to ground faults and single line to ground faults Transient Features of Fault Currents:

The fault current waveform resulting from either of examples (1) to (3) will contain features in the time domain, at the instant of the fault occurring, which are referred to as fault transients. The typical current versus time shape of these fault current waveforms is shown in FIG. 1. The transient fault current portion 24 and the steady state fault current portion 23 are clearly shown. The fault level on a system is typically specified or calculated (for example when MVA is used instead of kA) only in terms of the steady state value 23 of the fault current. However, with modern switchgear, which can open in 2-3 cycles on very high voltage networks (above 230 kV for example) or 5-10 cycles on lower voltage systems (below 110 kV for example), it is the full transient as well as the steady state current which most plant will be subjected to during fault conditions.

The fault current waveform of FIG. 1 also shows a DC component which dies away steadily. Both the three phase fault current and the earth/neutral current will behave in this way, for example, in the latter case, for a single line to ground fault.

However, in particular, there is a need to limit not only the three phase fault currents but also earth fault currents which flow when there is a short of one or two of the phases to ground. Protection from the effects of such faults is normally provided by neutral earthing resistors from manufacturers such as Cressall. These resistors can cost in the vicinity of AU$250,000 to purchase and install and are a significant undertaking. The use of neutral earthing resistors has a number of problems. Firstly, they are only useful when the fault is to ground. Secondly, they increase the voltage stress on the other phases when a fault occurs. They often require extra insulation of the neutral, require extra expense for transformers and are not cost effective unless protection is also upgraded.

Another solution to rising fault levels at substations include upgrading the low voltage side switchgear. This option often requires a substantial investment in capital and labour and is only effective as long as the fault level remains below the fault level of the new switchgear. This is not always true because subsequent additional transformers, and/or a reduction in the substation source impedance, can lead to the future fault level increasing beyond the new switchgear rating. An alternative solution to upgrading the switchgear is to split the bus and transformers into a number of isolated circuits such that each part of the load is supplied from a reduced number of parallel transformers.

For example, if a substation has two transformers operating in parallel, and the fault level of the switchgear is exceeded, then the bus may be split into two separate circuits each supplied by a single transformer. This doubles the substation fault impedance, which is desirable because the fault level will be nominally halved. However, this gain is at the expense of reduced reliability. Operating on a split bus means that if one transformer fails, all the load (i.e customers) connected on that transformer will lose supply until they can be switched over to the remaining good transformer. This can take up to 10 seconds which is sufficient to shut down computers and other sensitive factory automation and control equipment. Hence, it is not desirable for a utility or electrical network owner to operate in the split bus mode.

A further solution is to install so called "series limiting reactors", which act liked fixed value inductances and therefore present an impedance to the network and to fault currents. This technique, however, often leads to voltage regulation problems as the impedance also exists during normal operating conditions.

Further, higher impedance transformers can be installed. However, this again is likely to led to substantial extra expense, and is an unlikely solution for existing substations. In addition, this technique is not future proof as the addition of a further transformer at some future time will increase fault levels again.

SUMMARY OF THE INVENTION

It is an object of the present invention to provide for reduced neutral earth fault current utilising a fault current limiter.

In accordance with a first aspect of the present invention, there is provided a fault current limiter for limiting current faults in an electrical network comprising: a series of phase coils located adjacent a superconductive coil for fault current limiting phase faults within the network; a series of neutral coils located adjacent the superconductive coil for fault current limiting neutral earthing faults in the electrical network.

The neutral coils are preferably formed around a high permeability core and the superconductive coil can encompass a central core formed from a high permeability material. The phase coils and the neutral coils are preferably magnetically coupled to the central core.

In accordance with a further aspect of the present invention, there is provided a method of current limiting earthing faults in an electrical network the method comprising the steps of: utilising a fault current limiter between the electrical network and ground.

In accordance with a further aspect of the present invention, there is provided a method of current limiting faults in a multi-phase electrical network, the method comprising the steps of: (a) coupling a superconductive phase fault current limiter between each phase of the interconnection of each phase of the electrical network and a transformer; (b) coupling a superconductive neutral fault current limiter between the neutral of the transformer and the neutral of the network.

In one embodiment the superconductive phase fault current limiters and the superconductive neutral fault current limiter share the same cryostat and the same superconductive coil.

In accordance with a further aspect of the present invention, there is provided a fault current limiter for limiting current faults in an electrical network comprising: a series of phase coils located adjacent a superconductive coil for fault current limiting phase faults within the network; a series of neutral coils located adjacent the superconductive coil for fault current limiting neutral earthing faults in the electrical network.

BRIEF DESCRIPTION OF THE DRAWINGS

Preferred embodiments of the present invention will now be described with reference to the accompanying drawings in which:

FIG. 8 illustrates the phase current in the individual transformer circuit;

FIG. 11 illustrates the result obtained for an 8 terminal device.

DESCRIPTION OF PREFERRED AND OTHER EMBODIMENTS

In the preferred embodiment, there is provided a superconducting fault current limiter which fault current limits occurring not only on the three phases but also on a neutral line. Hence, the compact arrangement allows for the replacement of a neutral earthing resistor with a superconducting type FCL.

Figure 2:
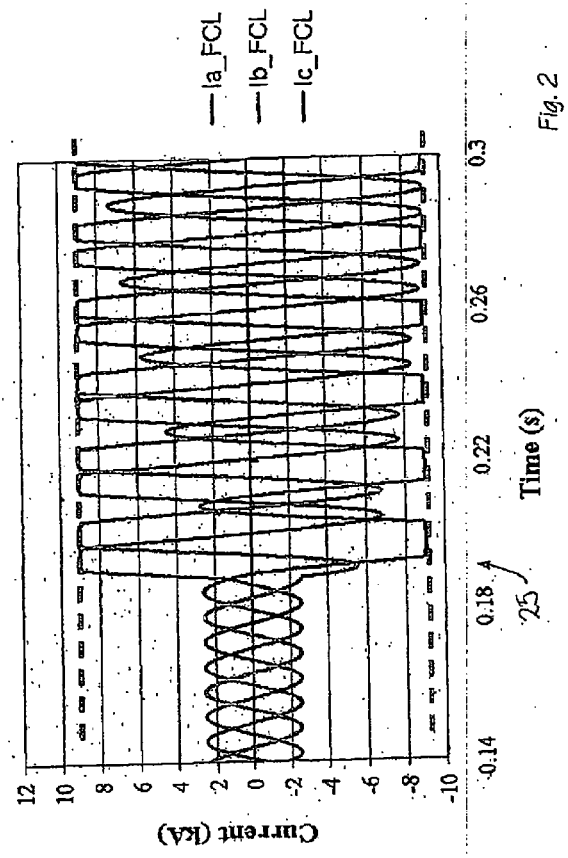
FIG. 2 illustrates a graph of typical fault current characteristics when using a HTS-FCL.

While alternative FCLs technologies exist, the utilisation of a HTS-FCL has the additional benefit of completely clipping the transient nature of the fault current waveform. For example, in FIG. 2 there is illustrated example output waveforms for a HTS-FCL protected fault. The waveforms clearly show the clipping operation 25 of the fault current limiter. Alternative technologies, which basically rely on steady state resistance and inductance to limit fault current, cannot achieve this functionality.

The advantages of reducing the transient of the fault current include

1. Reduced Costs of Circuit Breaker Maintenance

By clipping the transient of the fault current waveform, the maintenance of switchgear including circuit breakers (CB), and their failure rate can be reduced and their useful life extended. This is because the amount of energy dissipated during the first cycles (25) of a fault is severely reduced, eliminating the occurrence of re-striking, fouling of CB contacts, and CB contact wear.

Also, transformers are subjected to enormous electromagnetic and mechanical forces during fault events and although they are designed to withstand this force, many transformers which have been in the field for some time (e.g. 30 or more years) will be more susceptible to failing after a short circuit event. The reduced strength of paper in oil, winding looseness and reduced coil clamping forces that occur over time may not result in overt failure during the lightly loaded and steady state conditions that a transformer experiences at a sub-station. Under short circuit current, however, these nascent problems can result in ruinous transformer failure. The greatest forces occur during the transient period in the first few cycles, before the CB can open and quench the fault. Unlike other technologies, HTS-FCLs are able to clip the transient of the fault current waveform, thereby sparing the substation transformers from experiencing the tremendous transient forces and consequently increasing their useful life.

In order to clearly comprehend the operation of the preferred embodiment, there is provided an initial discussion of the operation of a HTS-FCL type device.

Figure 3:
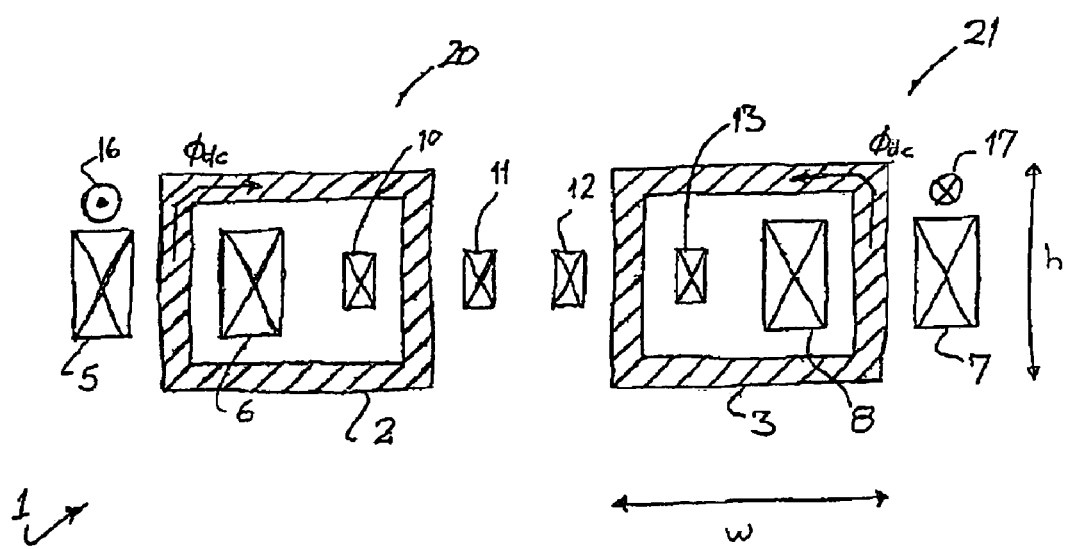
FIG. 3 illustrates a schematic sectional view through one form of fault current limiter.

FIG. 3 illustrates a sectional view through a known form of a DC saturated HTS FCL. Arrangement 1 of FIG. 3 utilises two separate closed iron cores 2, 3. Each of the cores has a separate DC HTS coil winding, with a first winding including sectional portions 5, 6 and a second winding including sectional portions 7, 8. Each of these DC HTS coil windings contains N turns.

Similarly, two series of alternating current (AC) linkage windings, including a first winding having sectional portions 10, 11 and a second winding having portions 12, 13 are also provided, with each of the windings having n turns.

Each of the iron cores structures 20, 21 has a given height h and a given width w. During operation, each core winding 5-6, 7-8 is saturated to a predetermined flux density value $\phi_{dc}$ with opposite sense, with the opposite sense being indicated by standard dot notation 16, 17. The DC current flows out of the page 16 in the positive cycle saturated core 5, 6, and into the page 17 in the negative cycle saturated core 7, 8. These points on the DC magnetisation curve of the cores are represented as $\pm B_{dc}$ and $\pm H_{dc}$, respectively.

Figure 1:
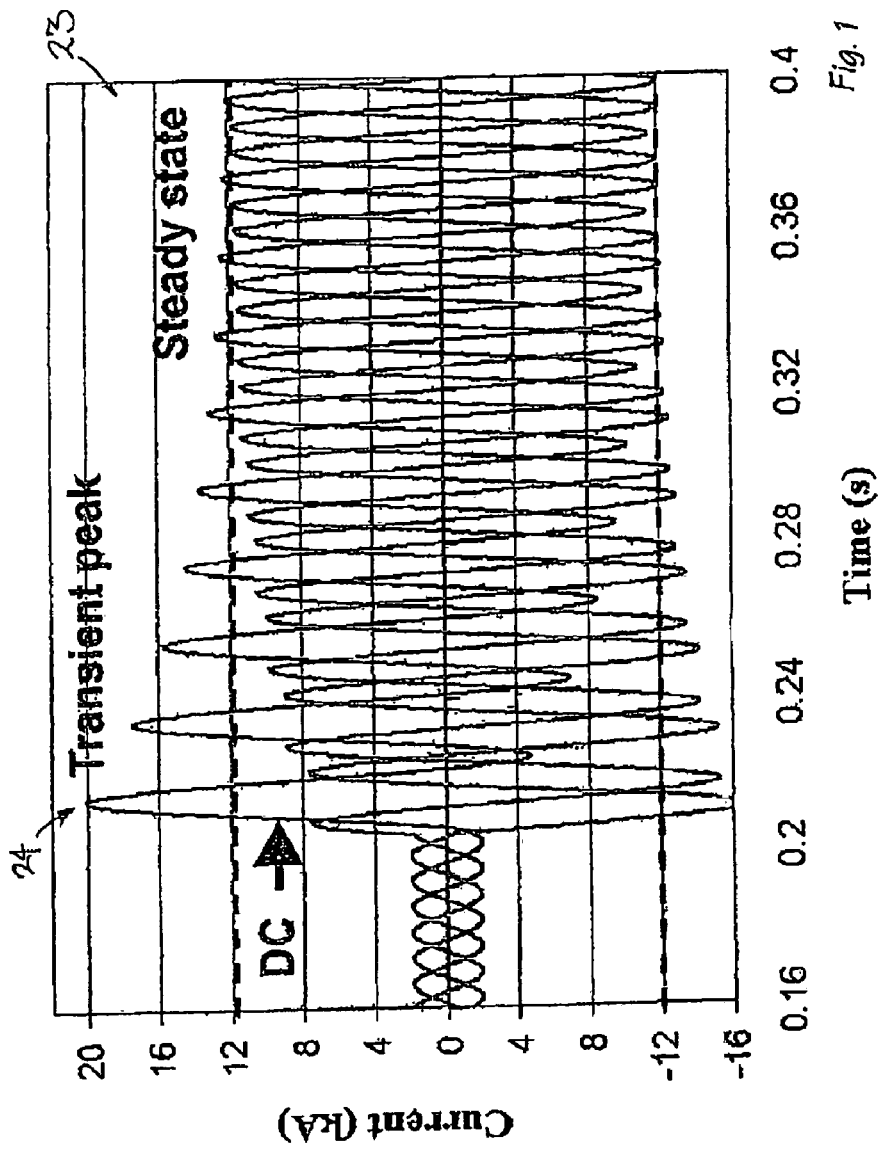
FIG. 1 illustrates a graph of typical fault current characteristics.

The required ampere-turns of each HTS DC coil 5, 6 and 7, 8 is given by $$NI = 2(2w+2h)H_{dc} \quad (1)$$

where N is the number of DC turns, I is the HTS coil excitation DC current, w is the effective core structure width in the plane of the paper of FIG. 1, h is the effective core structure height in the plane of the paper of FIG. 1, and $H_{dc}$ is the design value for the saturation of the core. It is assumed that the air gap in the core is negligible in equation (1).

The AC windings 10, 11 and 12, 13 are then arranged such that the differential permeability $\mu_{diff}$ from each AC coil is in the opposite sense to each windings' core magnetisation. The variable, $\mu_{diff}$ is defined by $$\mu_{diff} = (dB/dH)|_{average} = \Delta B/\Delta H \quad (2)$$

where $\Delta B$ and $\Delta H$ are the maximum extents of the minor hysteresis loop at the DC bias points $\pm B_{dc}$ and $\pm H_{dc}$, respectively.

In addition, the relative differential permeability may be defined as $$\mu_{rdiff} = \mu_{diff}/4\pi*10^{-7}.$$

For reference, the magnetic reluctance of the iron core presented to the DC coil is $$R = (Hl)/(BA) = l/\mu A \quad (3)$$

where R is the magnetic reluctance [$H^{-1}$], B is the magnetic field [T], A is the cross-sectional area of the iron core (not including any insulation or varnished area) [$m^2$], $\mu$ is the magnetic permeability of the iron core [$Hm^{-1}$], l is the mean magnetic length of each core that is approximately equal to 2w+2h [m], and H is the magnetic induction at the saturation point (NI/l) [$Am^{-1}$].

The steady state AC impedance presented to the network line in which the core is in series can be expressed in phasor notation as $$Z = R + 2\pi f(n^2 A/l)\mu_{diff} J \quad (4)$$

where R is the resistance of the AC coils, f is the frequency of operation (i.e. 50 Hz), J is the square root of −1 (the imaginary number), and n is the number of turns of the AC winding. R is normally negligible compared to the imaginary part of the impedance.

For an effective HTS FCL, the normal operating inductance of the core must be small so as not to impose any unnecessary regulation of the line or impedance to the current flow. This is normally achieved by ensuring that $B_{dc}$ is greater than 1.5 T, (depending on the saturation characteristics of the chosen core material, this figure could be 2.0 T for example if using typical transformer core steel laminations) and thereby ensuring that $\mu_{rdiff}$ is approximately 1, the device thereby behaving effectively as an air core inductor.

In operation, the DC field is chosen such that an oscillatory fault current of peak value $I_f$, determined by the network impedance and surge characteristics, increases the differential permeability to that of the maximum instantaneous value. The size of the cores, DC current and DC turns can be calculated based on the fault level and the permeability of the iron so that $$nI_{f(max)}/l = H_{dc} \quad (5)$$

and $$nI_{f(min)}/l = H_{dc} - H_{dc(sat)} \quad (6)$$

where n is the number of AC turns, l is the length of the magnetic circuit, $H_{dc}$ is the DC field intensity at which the iron core has a maximum $\mu_{diff}$, $H_{dc(sat)}$ is the field intensity required to saturate the core, $I_{f(max)}$ is the maximum fault current that the HTS FCL is required to limit, and $I_{f(min)}$ is the minimum fault current that the HTS FCL is required to limit.

Owing to the oscillatory nature of a fault current, two separate cores 20, 21, as shown in FIG. 1, are required to provide different senses of the AC coil current to the AC windings, as fault currents are oscillatory in nature, and require limiting on both the positive and negative parts of each cycle.

Figure 4:
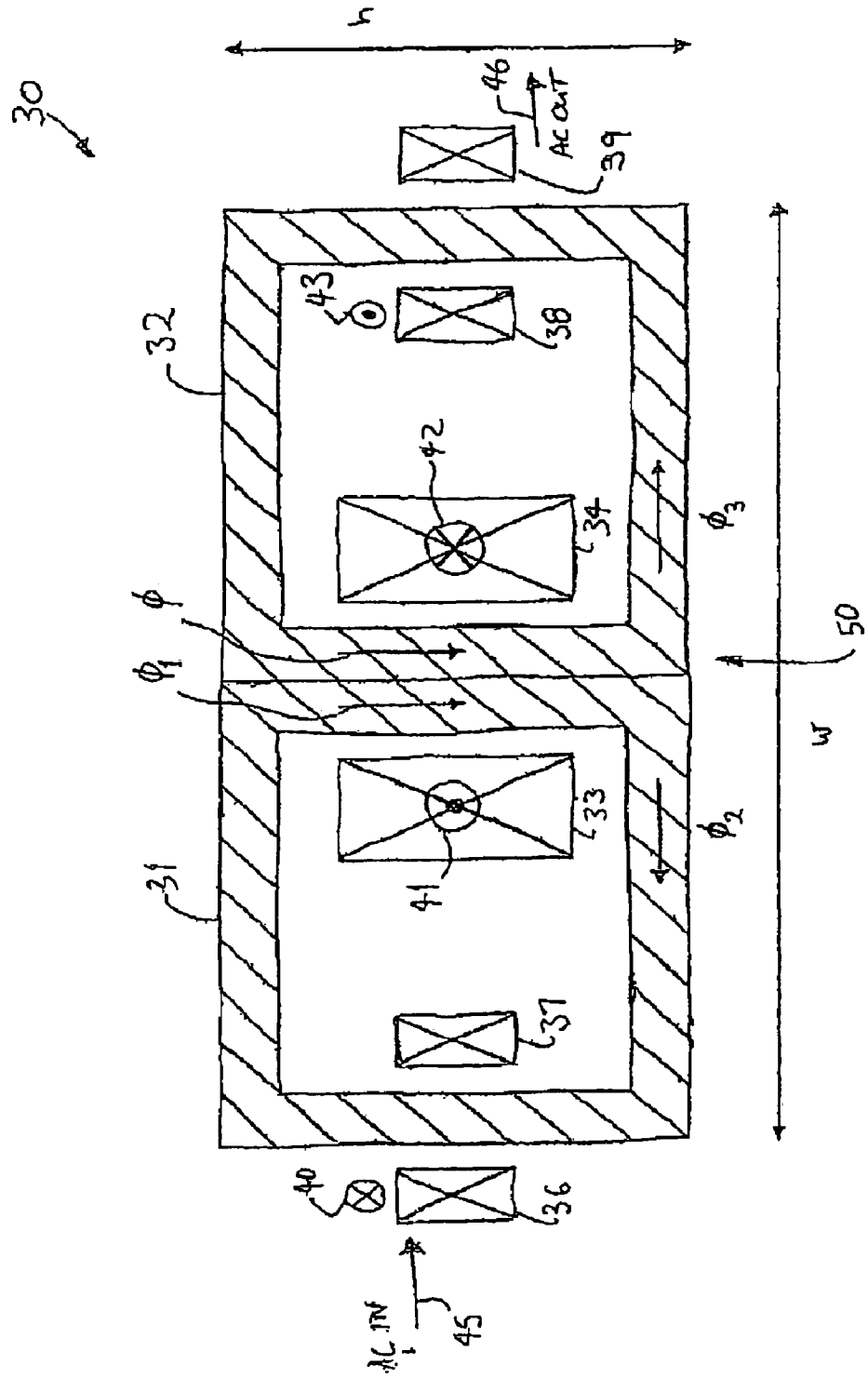
FIG. 4 illustrates a sectional view through a modified form of fault current limiter suitable for use with the present invention.

Preferably, an alternative more compact design is utilised in the construction of the preferred embodiment. Turning initially to FIG. 4, there is illustrated schematically an initial sectional view of a design arrangement 30 for a split core single phase of the HTS FCL of the preferred embodiment. The unit 30 includes a split core having components 31, 32 so as to allow for a substantial reduction in foot print size. In the arrangement 30, the DC saturated core windings are internally located 33. The AC linkage windings are also provided in pairs 36, 37 and 38, 39. The current carrying directions are as indicated via standard dot notation 40, 41, 42, and 43. The AC in port is assumed to occur at port 45 and the AC out port at port 46. The current flow through the arrangement is indicated by the standard dot notation.

The design of the arrangement 30 and, in particular, the dimensions of the core 50 can be in accordance with certain rules. The design is a compromise between the DC current and the level of saturation required. In a given case, the central limb 50 is designed to have twice the cross sectional area of the outer limbs. Depending on the fault level to be limited, the optimal area of the central limb would be a value situated between one and two times that of the outer limb area. Generally the following formulas can be used:

$$2\Phi_1 = \Phi_2 + \Phi_3 \quad (7)$$

and $$B_1 A_1 = B_2 A_2 + B_3 A_3 \quad (8)$$

where B is the magnetic flux density in each limb [T], A is the cross sectional area of each limb [m²], and Φ is the magnetic flux in each limb [Wb]. In one design, $B_2 = B_3$ and $A_2 = A_3$.

The AC coils 36, 39 are connected to the AC line such that the flux density of each coil is of opposite sense relative to the main DC flux, as indicated by the dot notation 40, 43 of FIG. 4. The central limb is a split limb to allow independent net fluxes $\Phi_2, \Phi_3$ to be set up in each external limb. This may be of a different net cross sectional area to the external limbs, depending on the designed intensity of $B_2$ and $B_3$.

It should be noted that this arrangement has a number of advantages including:

1. Only one DC winding is required 33, 34, thus saving on DC coil costs.
2. Only one containment vessel for the DC coil is required, thus saving on the unit's cost.
3. The footprint size is reduced, which confers advantages in placement.
4. A reduced volume of superconductor is required for the DC coil bias.
5. Only one cooling device for the DC coil is required.

The new number of turns required in the DC coil is:

$$NT'_{dc} = (3h' + 2w') H_{dc} \quad (9)$$

where N' is the number of turns in the DC coil, I'$_{dc}$ is the current in the DC coil, W' is overall width of the three limb core, and h' is the height of the three limb core.

Split limbs are commonly manufactured by transformer manufacturers. For example, in the case where a large core size necessitates an oil-cooling duct to ensure efficient cooling of the core, or, for five limb cores, where the central limb is divided into two to save on corner losses in the cores.

The arrangement of FIG. 4 can be utilised for the construction of a fault current limiter for limiting each phase fault current and the neutral fault current in an electrical supply system.

Figure 5:
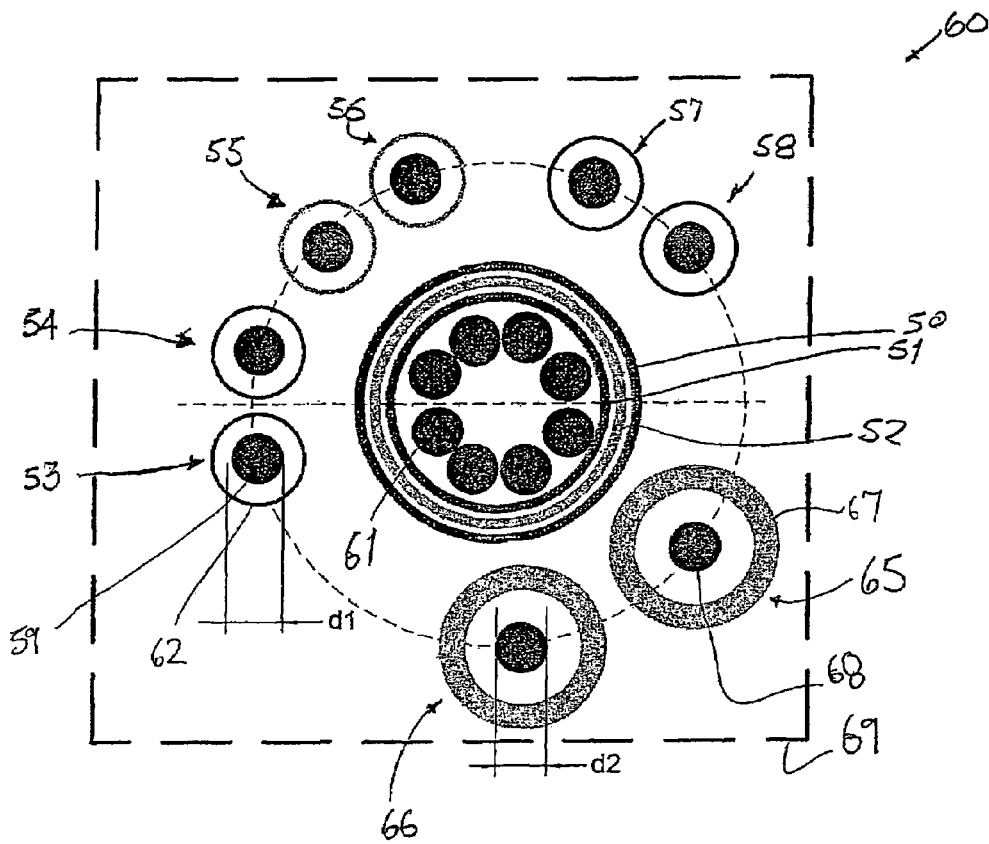
FIG. 5 illustrates schematically the arrangement of the overall fault current limiter device of the preferred embodiment.

Turning now to FIG. 5, there is illustrated a top schematic plan view of an arrangement which utilises the principles discussed with reference to FIG. 4. In this arrangement, a cryostat having walls 50, 51 is provided with a high temperature superconductor coil 52 located centrally therein. Three sets of phase coils are arranged around the cryostat including first set of phase coils 53, 54 second set of phase coils 55, 56 and third set of phase coils 57, 58. Each phase coil includes an iron core leg e.g. 59 that is coupled to a corresponding inner core e.g. 61. The iron core 59 is arranged internally to the AC coil e.g. 62 formed around thereof. Also provided are a series of neutrals 65, 66, the neutrals having a coil e.g. 67 around a central iron core e.g. 68. The overall footprint of the device is as illustrated 69.

Figure 6:
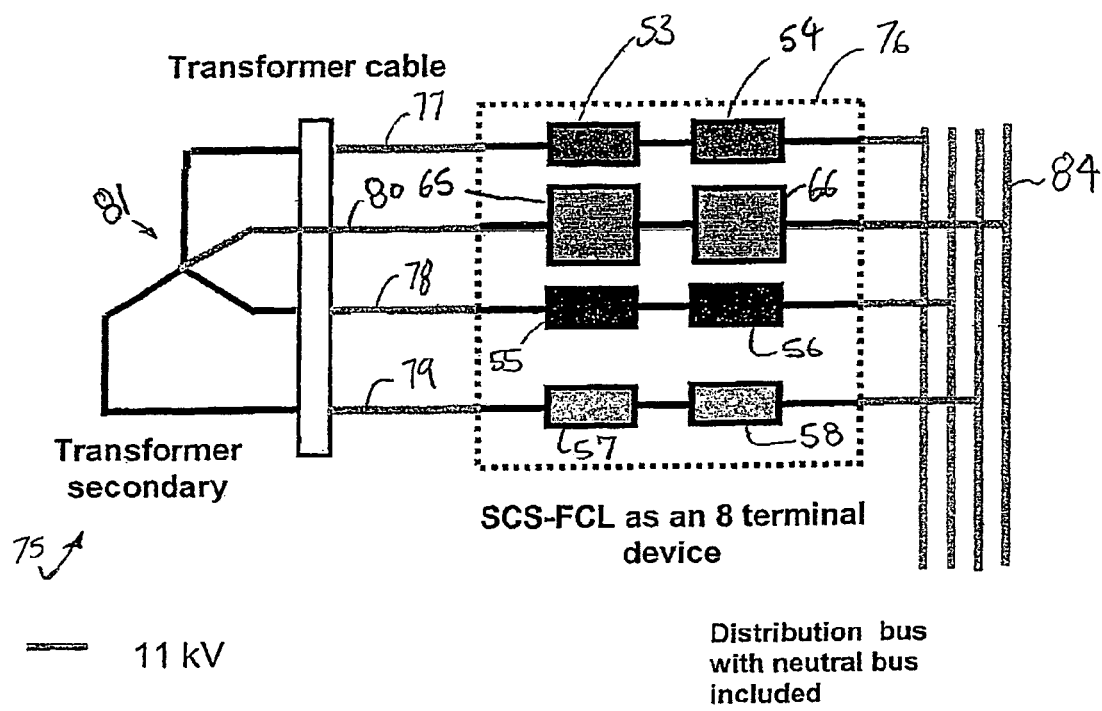
FIG. 6 illustrates schematically the interconnection of a fault current limiter within an electrical network.

Turning now to FIG. 6, there is illustrated schematically the connection technique for connecting a transformer secondary 75 with the HTS FCL device 76. In this arrangement, the three phases 77, 78, 79 are connected to their own corresponding cores 53, 55 and 57. Further, the Neutral earthing coil e.g. 65 is connected 80 to the star point 81 of the secondary transformer winding. The neutral coil 66 is in turn connected to the neutral of the bus 84. The incorporation of the neutral coils 65, 66 reduces the current level on an earth fault current when a short to ground occurs.

In this manner, a neutral earthing resistor can be dispensed with and the arrangement of FIG. 5 has the particular advantage that only one cryostat 52 is required.

The three sets of double coils 53-58 can be placed on six separate single window core structures of high permeability material and exhibiting magnetic field saturating characteristics above a predetermined critical field, Bcrit1 (units: Tesla). In addition, the extra set of double neutral coils 65, 66 are placed on single window core structure of the same or different material, but also exhibiting saturated characteristics above some certain magnetic field, Bcrit2.

The six identical coils 53-58 on the six identical single core windows can have the same cross sectional area, diameter, and window. These six coils are responsible for limiting the three phase symmetrical current.

It will be noted in the eight terminal device, the common limbs of each core structure are grouped together e.g. 61, therefore allowing a single superconducting coil 52 or other coil to magnetise the common core structures to a critical field Bcrit3, where $B_{crit3} > (B_{crit2}$ or $B_{crit1})$.

Hence, only a single cryostat having walls 50, 51 is required for cooling the superconductor coil 52.

In this new structure, the two additional coils 65, 66 can be designed to be substantially different from the six other coils 53-58, and hence used to limit fault currents in the earth and neutral connections by the large amounts required to be practical and as required by utilities. Typically, therefore, the neutral earth coils can be larger, and incorporate many more turns than the other six coils. This is because the limited current in the steady state case obeys the following equation:

$$n = NI/I_f$$

Where
N=number of DC bias turns (superconducting or conventional)
n=number of turns in the ac coils (either in the the 6 line fault current limiting coils or the neutral earth fault current limiting coils)
I=DC bias current in the saturating coil (superconducting or conventional)
$I_f$=required limited fault current amplitude.

Typically, the earth fault current must be limited to a much smaller amount than the three phase symmetrical fault, hence, the n value for the 'earth fault' coils 66, 67 will be greater than for the six "line fault limiting coils" 53-58.

By arranging the coils as shown in FIG. 5, it is possible to provide a more economical system having earth fault current limiting capabilities.

Further, simulation studies were carried out in order to determine the operational aspects of the preferred embodiments. In these studies various types of faults were simulated on the load. These included three phase symmetrical faults and line to ground faults. A 11 kV substation fault characteristics were simulated using a software package designed for the purpose. An eight terminal device was simulated which was designed in accordance with the aforementioned description to not only deal with symmetrical three phase faults but also earth faults.

Four cases were simulated at the substation to describe the functionality and advantages Case 1—Base case—no fault limiting devices at the substation Case 2. A HTS-FCL of a six terminal design limiting three phase currents Case 3. An NER only, severely limiting earth fault current to about 1 kA Case 4. An 8 terminal FCL device tuned to limit the three phase fault current and tuned differently to reduce the neutral bus fault current as severely as the NER.

Figure 7:
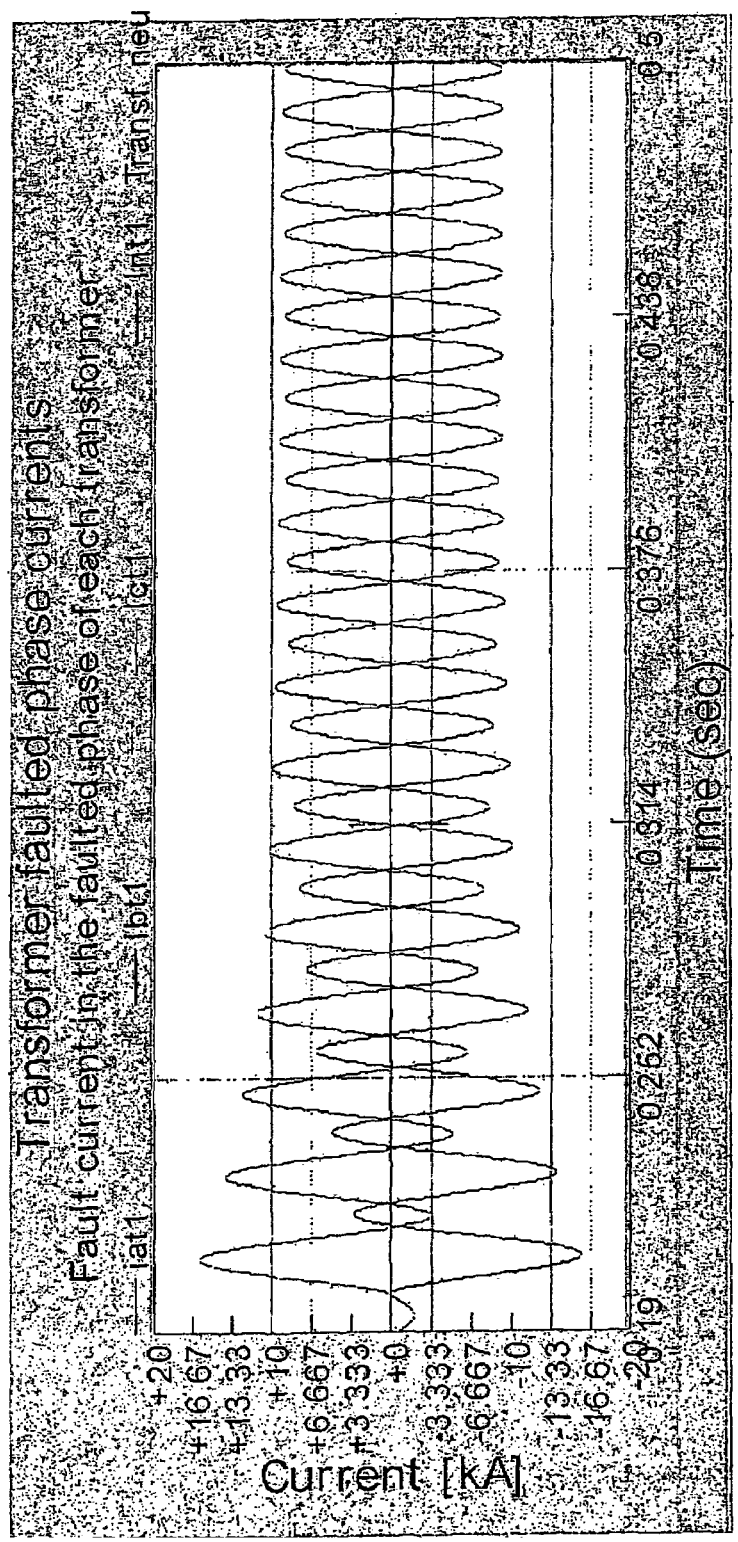
FIG. 7 illustrates a simulated phase to ground fault without an NER installed.
Figure 8:
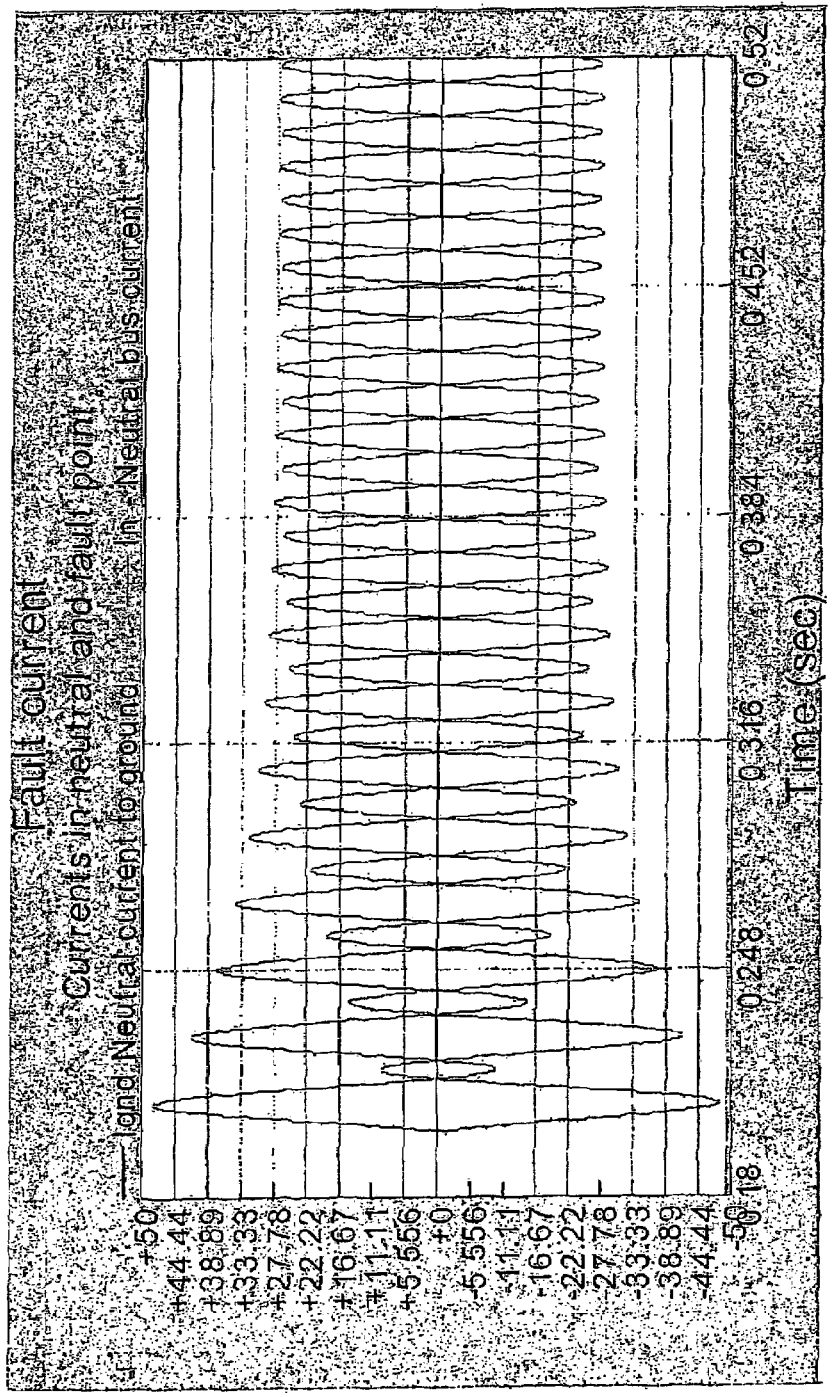
FIG. 8 illustrates a simulated phase to ground fault without an NER installed.

FIG. 7 shows the resulting simulated earth fault current at a substation without any fault limiting devices (FCLs or NERs). FIG. 8 shows the phase current in the individual transformer circuit which represents ⅓rd of fault current on the bus.

Figure 9:
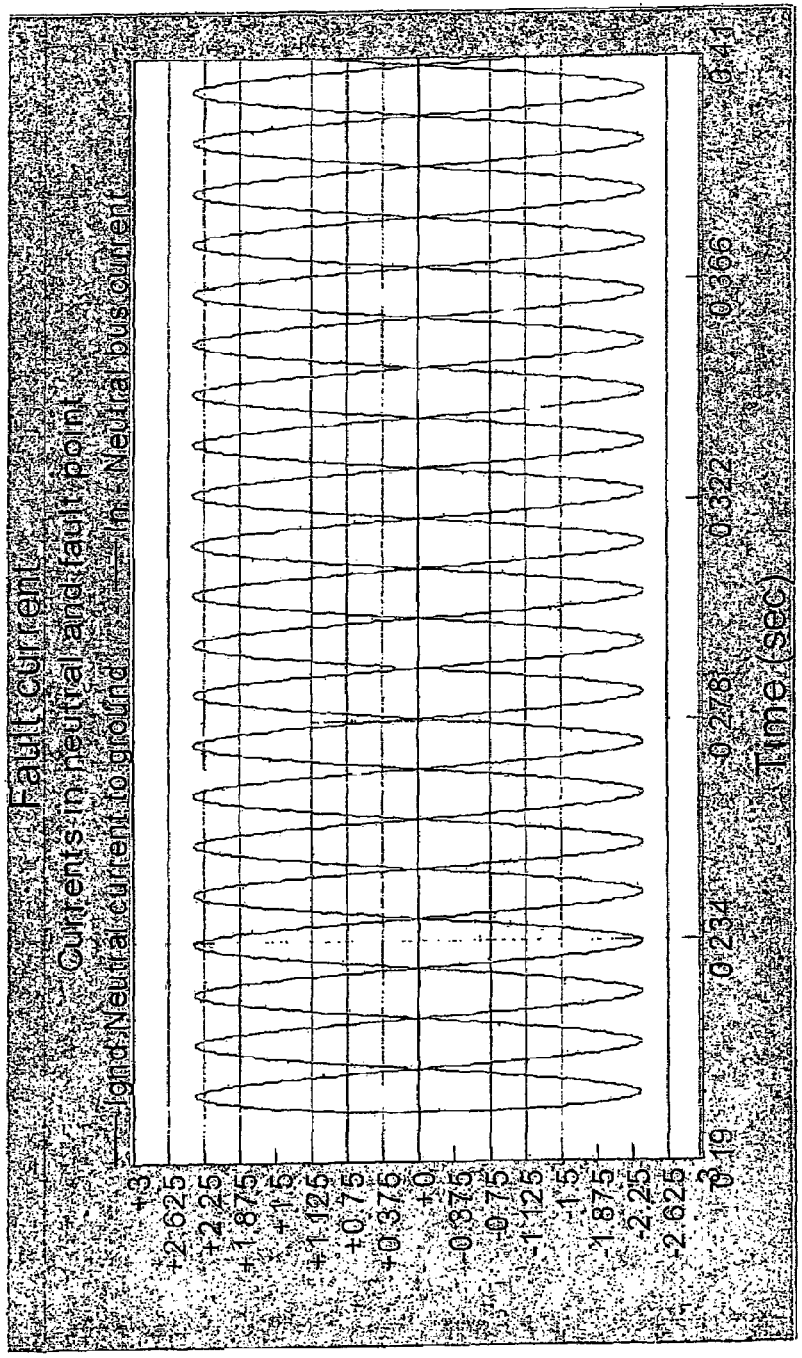
FIG. 9 illustrates three phase fault current in the 3 lines of the transformer.

FIG. 9 shows three phase fault current in the 3 lines of the transformer (T1) when using a SCS-FCL of the six terminal design and limited by the appropriate amount to a 6 kA peak (4.24 kA RMS per transformer).

Figure 10:
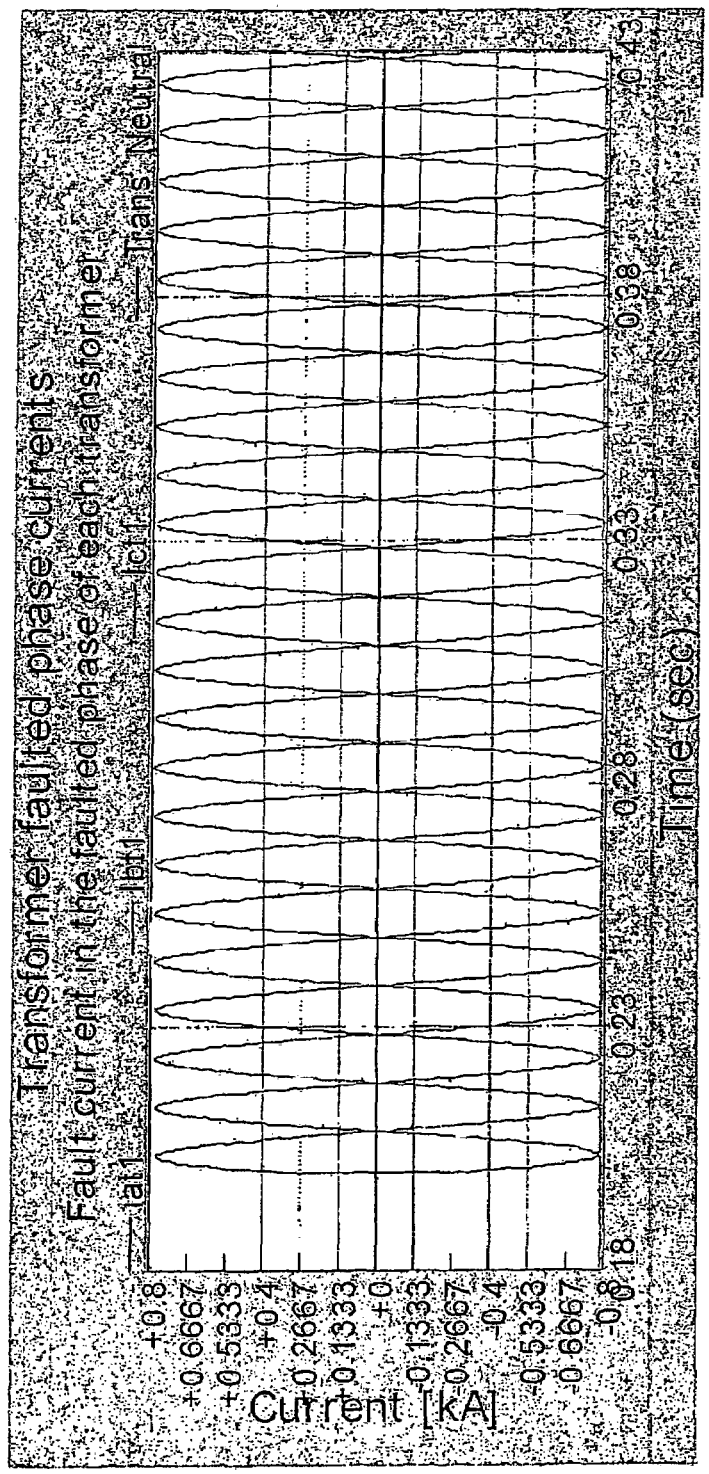
FIG. 10 illustrates the earth fault current in the faulted phase when a 3.9 Ω NER only is incorporated.

FIG. 10 shows the earth fault current in the faulted phase when a 3.9 Ω NER only is incorporated. The NER effectively reduces the line and ground fault current from 19.6 kA rms to 1.7 kA rms. This is consistent with the calculated steady state earth fault current from equation 1 below which reduces to the approximate simplified equation 2 below when the NER impedance is much higher than the sequence component impedance values.

$$Ia = Ignd = \frac{3(11.54/\sqrt{3})}{Zo + Z1 + Z2 + 3ZNER} \quad \text{Eq 1}$$

$$Ia = Ignd = \frac{(11.54/\sqrt{3})}{ZNER} \quad \text{Eq 2}$$

where Ia=phase a current, $Z_0, Z_1, Z_2$=source impedance sequence components at the 11 kV bus, $Z_0+Z_1+Z_2$=0.224+J1.3713=1.3895 angle 80.7°, $Z_{NER}$ is the NER resistance.

The SCS-FCL reduces the earth fault current from 20.19 kA RMS to 19.5 kA rms. Hence, this FCL design is equivalent to an NER of 0.26 Ω (This is obtained by employing equation 1 with $I_{gnd}$=19.5 kA and solving for $Z_{NER}$). That is, an NER of 0.26 Ω would be required to achieve the same result. Hence, by employing SCS-FCLs, the rating of the NER installed could be reduced from 3.90 Ω to 3.64 Ω. More interesting, however, is the possibility of reducing the earth fault current to levels comparable to the case of a 3.9 Ω NER. This would remove the need for an NER altogether.

It was shown that a SCS-FCL design optimised for reducing the bus fault level is not appropriate for limiting earth faults down to the very low levels required. Additionally, it was found that SCS-FCL optimised for reducing the ground fault levels are not appropriate for the three phase fault conditions. Hence, an eight terminal device was simulated consisting of the original identical three AC double coils but with an additional set of double coils specifically tuned to limit the neutral/ground fault current to the very low levels required.

The neutral winding can have a different number of turns, specifically designed for reducing earth faults. This winding can be tuned to the earth fault current reduction required, as this is often more severe than the symmetrical fault reduction, and can be connected in the neutral bus of the site.

FIG. 11 shows the result obtained for the 8 terminal device. As can be seen the earth fault current is reduced by a greater amount (to 1 A rms per transformer) than the line current (to 4.24 kA rms per transformer) as required in a practical utility application. This design therefore allows the three phase line current to be limited by an amount which will meet the fault level requirements of the site, and the earth current to be limited by other criteria. The 8 terminal device design has enabled the fault level to be kept at 250 MVA (1.73*11.47*4.24*3), and also simultaneously reduced the earth fault level (to 1 kA rms), all in one device. Consequentially, existing switch gear can be retained, and the NER does not need to be installed resulting in substantial savings.

The foregoing describes the preferred embodiments of the present invention. Modifications, obvious to those skilled in the art can be made thereto without departing from the scope of the invention.

The claims defining the invention are as follows:

1. A fault current limiter for limiting current faults in an electrical network, comprising:
    a series of phase coils located adjacent a superconductive coil for fault current limiting phase line to phase line faults within the network; and
    a series of neutral coils located adjacent the superconductive coil for fault current limiting neutral faults in the electrical network.

2. A fault current limiter as claimed in claim 1, wherein the neutral coils are formed around a high permeability core.

3. A fault current limiter as claimed in claim 1, wherein the superconductive coil encompasses a central core formed from a high permeability material.

4. A fault current limiter as claimed in claim 3, wherein the phase coils and the neutral coils are magnetically coupled to the central core.

5. A method of current limiting faults in a multi-phase electrical network, comprising the steps of:
    (a) coupling a superconductive phase fault current limiter between each phase of the electrical network and a transformer for fault current limiting of phase line to phase line faults; and
    (b) coupling a superconductive neutral fault current limiter between the neutral of said transformer and the neutral of said network for fault current limiting of neutral faults on a neutral line;
    wherein the superconductive phase fault current limiters and the superconductive neutral fault current limiter share the same superconductive coil thereby allowing a single superconducting coil to magnetize the common core structures.

6. A method as claimed in claim 5, wherein the superconductive phase fault current limiters and the superconductive neutral fault current limiter share the same cryostat.

* * * * *